No. 896,770. PATENTED AUG. 25, 1908.
H. B. SPERRY.
RAKE.
APPLICATION FILED SEPT. 10, 1902.
2 SHEETS—SHEET 1.
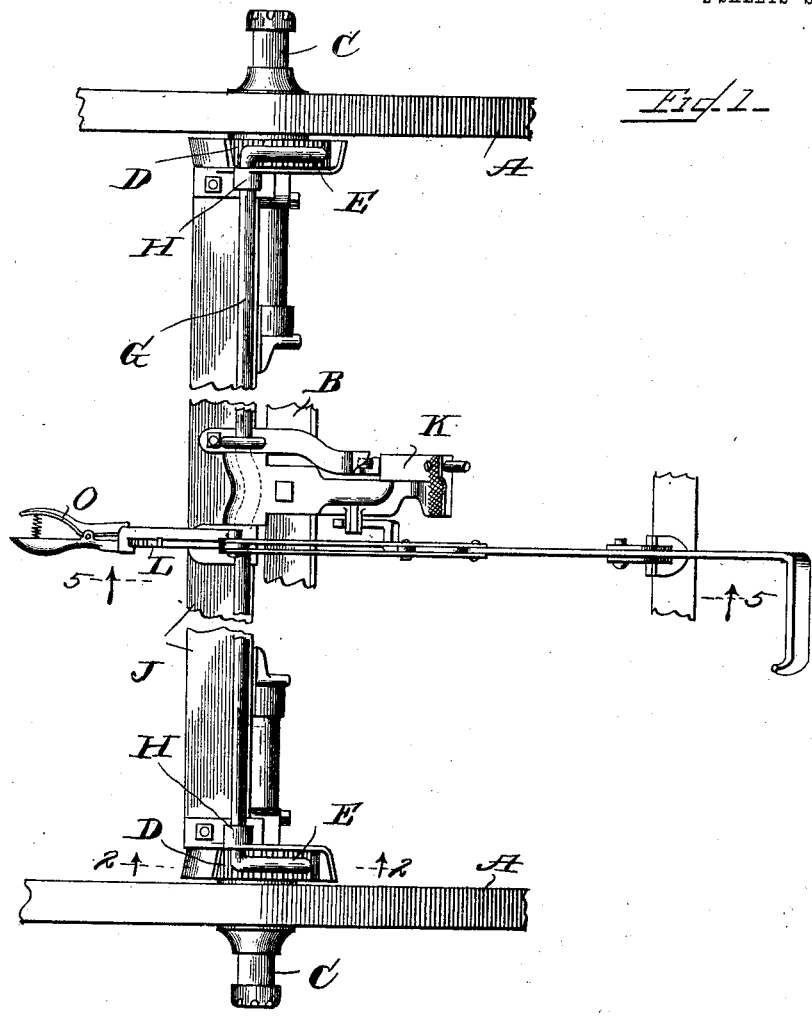
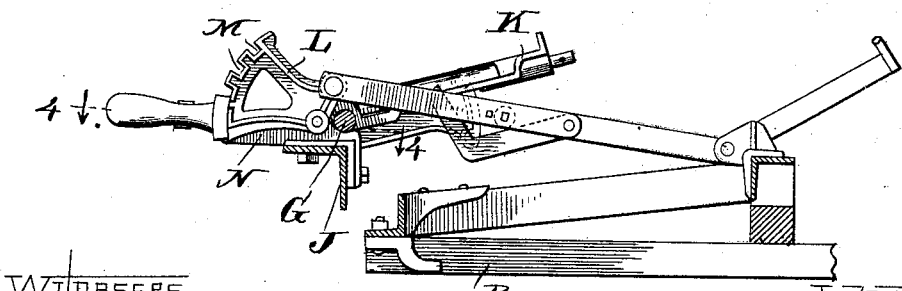
Witnesses
G. A. Rauschmidt
Chas. H. Seem
Inventor
Herbert B. Sperry
By Brown & Darby
Attys.

No. 896,770. PATENTED AUG. 25, 1908.
H. B. SPERRY.
RAKE.
APPLICATION FILED SEPT. 10, 1902.
2 SHEETS—SHEET 2.
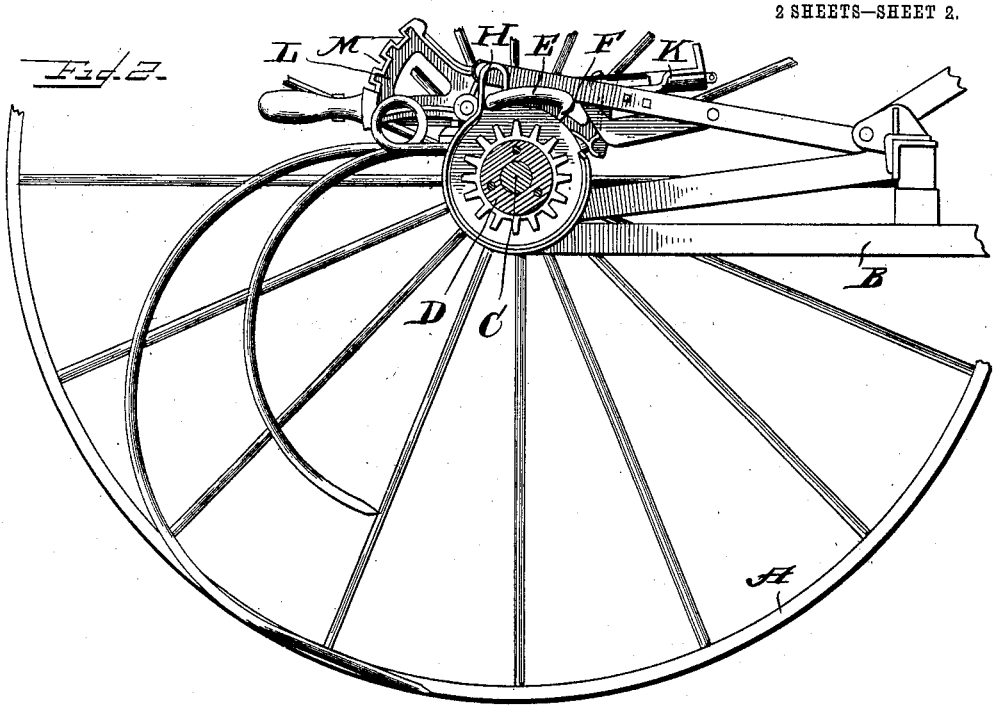
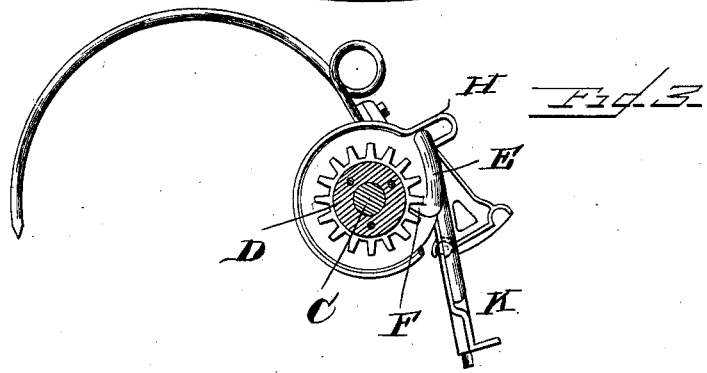
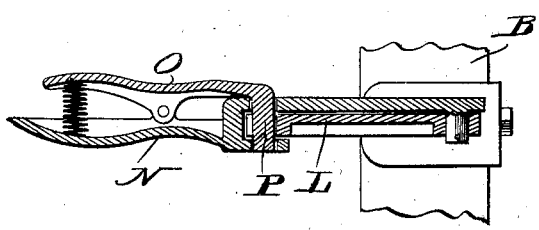
Witnesses
Inventor
Herbert B. Sperry
By Mown + Darby
Attys.

UNITED STATES PATENT OFFICE.

HERBERT B. SPERRY, OF SPRINGFIELD, OHIO, ASSIGNOR, BY MESNE ASSIGNMENTS, TO INTERNATIONAL HARVESTER COMPANY, OF CHICAGO, ILLINOIS, A CORPORATION OF NEW JERSEY.

RAKE.

No. 896,770.  Specification of Letters Patent.  Patented Aug. 25, 1908.

Application filed September 10, 1902. Serial No. 122,854.

*To all whom it may concern:*

Be it known that I, HERBERT B. SPERRY, a citizen of the United States, residing at Springfield, in the county of Clark and State of Ohio, have invented a new and useful Improvement in Rakes, of which the following is a specification.

This invention relates to rakes.

The object of the invention is to provide means whereby the rake teeth may be efficiently rocked or raised to dump the hay, grass or the like being raked, which is simple in construction and efficient in operation.

A further object of the invention is to provide a construction of ratchet dumping mechanism for rakes which is interchangeable with respect to wheels of the rake, and wherein an efficient interlocking of the parts of the dumping ratchet mechanism is secured.

A further object of the invention is to provide means for efficiently locking the rake teeth in any desired position of elevation for operation in the field.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

Referring to the accompanying drawings, and to the various views and reference signs appearing thereon,—Figure 1 is a top plan view, parts broken off, of a rake showing the application thereto of a construction embodying the principles of my invention. Fig. 2 is a view in transverse section on the line 2, 2, of Fig. 1, looking in the direction of the arrows. Fig. 3 is a vertical transverse section similar to Fig. 2 showing the rake teeth in elevated or raised position. Fig. 4 is a broken detail view in section on the line 4, 4, of Fig. 5, looking in the direction of the arrows. Fig. 5 is a broken detail view on the line 5, 5, Fig. 1, looking in the direction of the arrows.

The same part is designated by the same reference sign wherever it occurs throughout the several views.

In the ordinary construction of rakes, wherein provision is made for rocking the rake teeth supporting bar so as to raise or swing vertically the rake teeth to permit of the dumping of the same, it is usual to provide ratchet mechanism, but such mechanism has heretofore generally been constructed in "rights" and "lefts;" that is to say, the ratchet mechanism for one wheel or on one side of the machine has been specially adapted for that wheel or side of the machine, and the ratchet mechanism for the other wheel or side of the machine has been specially adapted therefor. The result is that care is required in assembling the parts and in shipping the same, and great annoyance and delay has been encountered in shipping the machines in large quantities by reason of the fact that the ratchet mechanisms not being interchangeable have become mixed, so that two "rights" or two "lefts" have been shipped for the same machine, instead of a "right" and a "left." This will be better understood when it is remembered that the ratchet wheel on one side of the machine presents the teeth thereof in a direction to be engaged by a pawl supported and extending in a particular way, and the ratchet wheel on the other side of the machine presents its teeth in the same direction so as to accommodate the pawl which is similarly arranged with respect to the pawl on the opposite side. Consequently, if a ratchet wheel on one side be shifted to the opposite side of the machine the ratchet teeth would be presented in the wrong direction. This is what is meant when I refer to the parts as being "right" and "left." It is among the special purposes of my present invention to provide a construction of rake teeth lifting mechanism which is equally well adapted for use on both sides of the machine, that is in parts which are interchangeable and which would operate as well on one side of the machine as on the other.

In setting the rake teeth to operate at a certain height, and in adjusting the rake teeth to operate at different heights, it has been customary to employ an adjusting handle or lever and a locking pawl therefor, said locking pawl operating over a toothed segment, the pawl engaging by a lengthwise movement into the notches or teeth of said segment and operating to hold the adjusting lever and hence the rake teeth at the desired height. In practice, however, I have found that frequently the locking pawl is shaken or jolted out of engagement with the notches or teeth of the segment, thereby causing the rake teeth to drop or to be lowered. It is also among the special purposes of my invention to provide means whereby the locking pawl is prevented from being jolted out of engaging relation with respect to the teeth of the toothed segment, and to accomplish this result I arrange the adjusting lever locking pawl to engage in the seat or teeth of the segment by a lateral movement.

These and other features of my invention are shown in the accompanying drawings, wherein reference sign A, designates the wheels of a rake; B, the frame, and C the axle upon which the wheels are mounted. The parts may be of the usual or any well known type or construction, and in the specific construction and arrangement thereof forms no part of my present invention.

Suitably mounted on or associated with the hub of each wheel is a lifting ratchet D. This ratchet in accordance with the principles of my invention is in the form of a gear wheel, having teeth similar to the teeth of a spur wheel, that is, the teeth are provided with flat sides or faces, as clearly indicated in Figs. 2 and 3.

Coöperating with the teeth of each ratchet wheel D, is a pawl or finger E, having a hook-shaped end, indicated at F, adapted to engage and coöperate with the teeth of ratchet gears D, to form a lock, whereby when said ratchet wheels are rotatably moved the pawls are carried therewith, and the hooked ends F, of said pawls are so shaped as to engage the spur teeth of the ratchet wheels D, and in locking relation whether said ratchet wheels are locked on one side of the machine or the other. In other words, with this construction the ratchet gears D, are duplicates of each other and are interchangeable and may be employed on either side of the machine and still be efficiently engaged in locking relation by the pawls E. The pawls E are formed on the ends of a rod G, arranged to extend transverse of the machine and carried in keepers or bearings H, formed on or mounted upon the rake tooth bar J, upon which the rake teeth are mounted and supported. The rod G, is mounted for axial rocking or swinging movement whereby the pawls E, at the ends thereof may be rocked into or out of engaging relation with respect to the ratchet gears D, and as usual in machines of this class, the rake tooth supporting bar J is so mounted that when the pawls E, engage in the ratchet teeth of wheels D, an axial rotation is imparted to said supporting bar J, to raise or swing the rake teeth vertically. Rocking movement may be imparted to rod G, to effect the engagement or disengagement of locking pawls E, in any suitable or convenient manner. I have shown a foot lever K, for accomplishing this result, said foot lever being suitably connected to said rod G, to accomplish the rocking movement of the latter.

I will now describe the locking pawl feature of my invention.

L, designates a segment rack or plate, suitably fixed to the rake tooth bar J and provided with notches or seats M, in the arc thereof.

N, designates a handle or lever suitably connected to the rake tooth bar J, whereby by manipulating said lever said rake tooth supporting bar may be rocked into any desired position of adjustment to hold the rake teeth at any desired height for operation in the field.

It will be observed by reference to Fig. 4 that lever N is provided with an overlapping flange and the periphery of the segment plate L is received between the body portion and the flange portion of said lever.

O, designates a locking pawl pivotally mounted intermediate its ends upon lever N, and provided at its inner end with a lateral extension or projection P, (see Fig. 4) arranged to project laterally through a slot or opening in lever N, and through a notch or seat M, of segment plate L and then through a slot or opening in the overhanging or overlapping flange of lever N. By this construction the locking detent O, is efficiently held in engagement in the seats, notches or recesses M, and is prevented from being jolted or jarred out of engaging relation with respect thereto.

Having now set forth the object and nature of my invention, and a construction embodying the principles thereof, what I claim as new and useful and of my invention, and desire to secure by Letters Patent, is:

1. In a rake, the combination with supporting wheels, of a teeth supporting bar, a spur gear carried by each of said wheels to rotate therewith, said spur gears being interchangeable, a rocking rod mounted on said bar and extending approximately parallel therewith throughout the length thereof, the ends of said rod terminating adjacent the gears, angular extensions on the ends of said rod adjacent the peripheries of the said gears and engaging portions formed at the extremity of said angular extensions disposed at an angle thereto and adapted to engage the teeth of said gears, there being an angular surface on said teeth engaging portions whereby the reverse movement of the interchangeable gear will cause the teeth engaging portion to lift out of engagement therewith, and a lever secured to the rod whereby the engaging portions thereon may be controlled with respect to the said gears.

2. In a rake, the combination with supporting wheels of gears supported by each of said wheels to rotate therewith, teeth on the periphery of said gears, said teeth being provided each with two opposite pawl engaging surfaces converging outwardly from the peripheries of said gears, each of said surfaces lying in planes uniformly inclined to the peripheries of said gears, a rake tooth supporting bar, a rod extending transversely from wheel to wheel approximately parallel with said rake tooth supporting bar and journaled thereon adjacent each of the said gears but on the exterior of the peripheries of said gears, pawls secured to the ends of said rod adjacent said gears and adapted to engage with the said teeth thereon, there being angular surfaces on said pawls on the opposite sides of the engaging surfaces thereof and adapted to engage the teeth on the said gears whereby the reverse movement of the gears will cause the pawls to lift out of engagement with the teeth of said gears, means whereby the journal bearing of the pawl carrying rod on the tooth bar may be shifted in relation to the peripheries of said gears when the pawls are lifted out of engagement with the teeth of the gears by the reverse movement thereof, and a lever secured to said rod for controlling the same and the pawls carried thereby.

3. In a rake, the combination with supporting wheels, of a gear supported by each of said wheels to rotate therewith and provided with teeth, said teeth being provided each with two opposite pawl engaging surfaces converging outwardly from the peripheries of said gears, each of said surfaces lying in planes uniformly inclined to the peripheries of said gears, and pawls mounted adjacent to said gears and adapted to be moved into engagement therewith.

4. In a rake, the combination with supporting wheels, of a gear supported by each of said wheels to rotate therewith and provided with teeth, said teeth being provided each with two opposite pawl engaging surfaces converging outwardly from the peripheries of said gears, each of said surfaces lying in planes uniformly inclined to the peripheries of said gears, a rake tooth supporting bar, a rod journaled on said bar and extending transversely across the machine, the ends of said rod terminating adjacent the gears and being bent to an angle to the body portions, the extremities of said bent portions being disposed at an angle thereto to form locking pawls, said pawls coöperating with the teeth of said gears, and a lever connected to said rod to rock the same to carry said pawls into engaging relation with respect to said gears.

In witness whereof I have hereunto set my hand, this fifth day of September, 1902, in the presence of the subscribing witnesses.

HERBERT B. SPERRY.

Witnesses:
 WM. H. GUTHRIE, Jr.,
 A. L. SPRINKLE.